United States Patent [19]

Mitchell

[11] Patent Number: 4,682,919
[45] Date of Patent: Jul. 28, 1987

[54] PORTABLE POWERED PIPE WORKING MACHINE

[75] Inventor: Joseph T. Mitchell, Waterford, Pa.

[73] Assignee: Reed Manufacturing Company, Erie, Pa.

[21] Appl. No.: 859,829

[22] Filed: May 5, 1986

[51] Int. Cl.$^4$ .............................................. B26B 27/00
[52] U.S. Cl. ...................................... 409/179; 30/97; 82/46; 82/70.2
[58] Field of Search ............... 30/95, 96, 97; 82/4 C, 82/70.2, 78, 83, 92; 409/179, 180, 183, 184, 199, 200, 204, 209

[56] References Cited

U.S. PATENT DOCUMENTS

| | | | |
|---|---|---|---|
| 1,932,462 | 10/1933 | Howlett | 29/69 |
| 2,291,395 | 7/1942 | Levey | 29/69 |
| 2,561,484 | 7/1951 | Shaw et al. | 409/179 |
| 2,842,238 | 7/1958 | Shaw et al. | 90/12 |
| 3,088,352 | 5/1963 | Tanner | 82/59 |
| 3,168,002 | 2/1965 | Walling | 90/12 |
| 3,431,646 | 3/1969 | Young | 30/97 |
| 3,688,615 | 9/1972 | Protze et al. | 82/4 C X |
| 3,916,519 | 11/1975 | Gilmore | 30/97 |
| 4,490,909 | 1/1985 | Wachs et al. | 30/97 |

FOREIGN PATENT DOCUMENTS

| | | | |
|---|---|---|---|
| 0106717 | 8/1980 | Japan | 30/97 |
| 831098 | 3/1960 | United Kingdom | 30/97 |

OTHER PUBLICATIONS

Reed's, "Power Option For Rotary Cutters", sheet number 698198.
Fein Pneumatic Pipe Milling Machines.
Wachs, "Trav—L—Cutter", Model E (pneumatic), Model H—E, (hydraulic).
Mathey Mfg. Inc., "The Morton Band Type Cutting & Beveling Machine".
H & M Pipe Beveling Machine Co., Inc., "Pipe Cut—Off Machine".
Wheeler Pilot, "Orbital Pipe Machining Tool", Model 5612.
Wheeler Pilot International, Price List, Jul. 1, 1984, "Satellite Pipe Machine".
Keelcutter, N600LRC, No. 1091356.
Keel Cutter, N600, Nakanos, Fuji Kiko Co., Ltd.

*Primary Examiner*—Gil Weidenfeld
*Assistant Examiner*—Glenn L. Webb
*Attorney, Agent, or Firm*—Howson and Howson

[57] ABSTRACT

A portable powered machine particularly suited for cutting and bevelling large diameter pipe of various composition. The machine comprises a carriage and adjustable link assembly movable manually about the periphery of a pipe. A motor for rotating a cutting and bevelling tool is mounted in the carriage for adjustable movement radially of the pipe. A tool guard housing having a rectractable cover is mounted to the carriage for adjustable movement with the motor.

11 Claims, 3 Drawing Figures

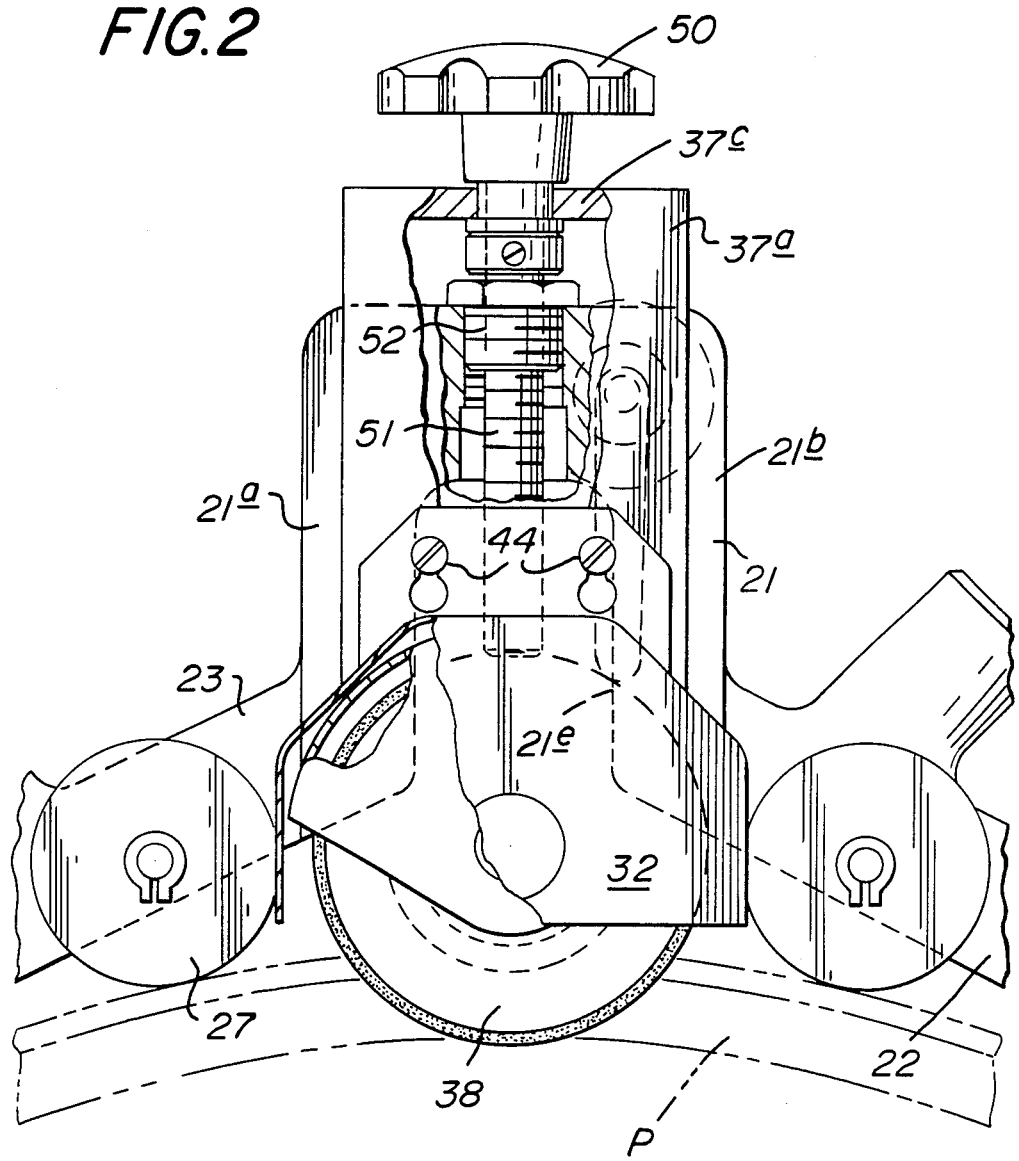

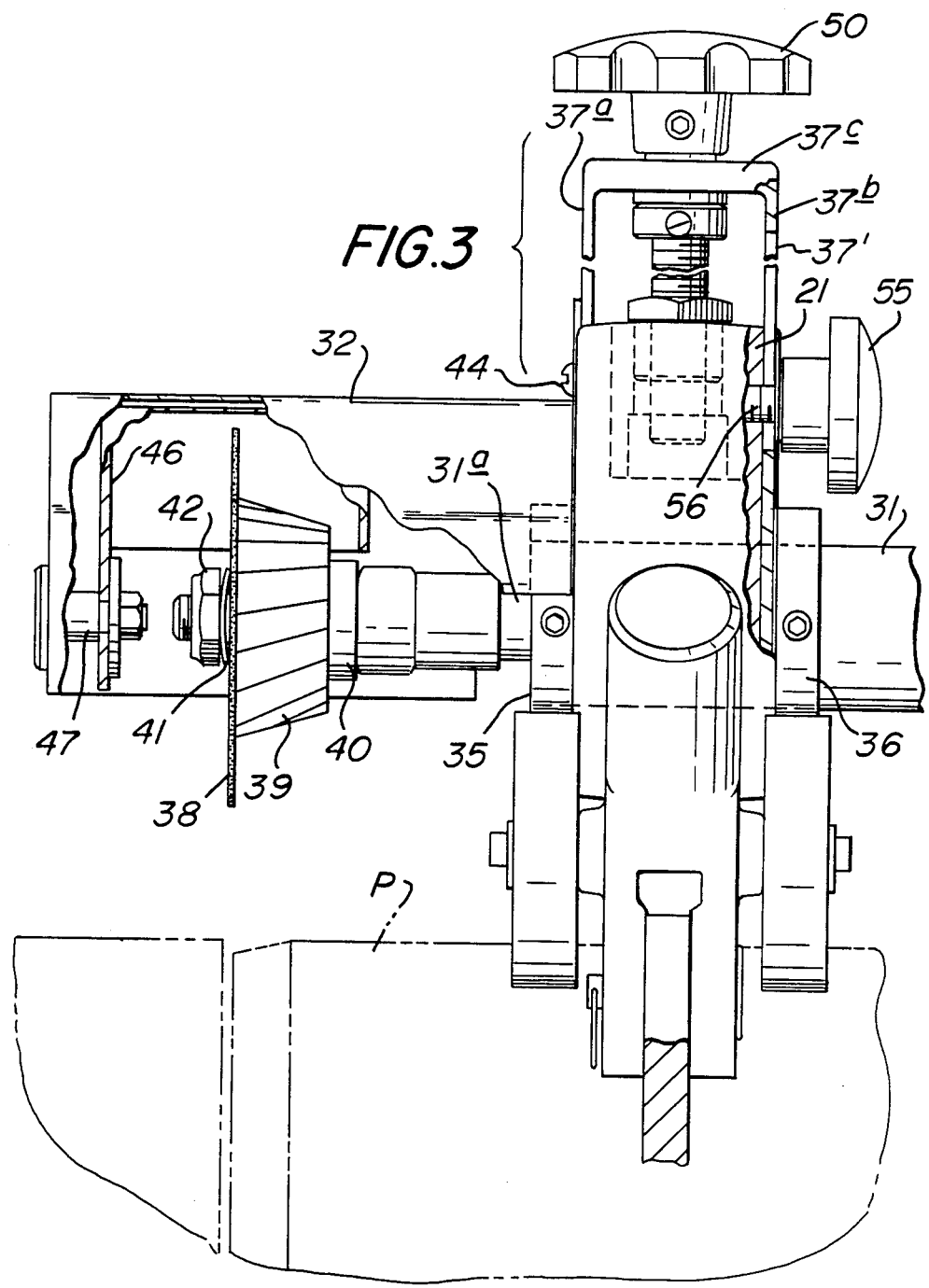

PORTABLE POWERED PIPE WORKING MACHINE

FIELD OF THE INVENTION

The present invention relates to portable pipe working devices, and more particularly, the present invention relates to powered portable machines particularly suited for use in cutting and bevelling large diameter pipes.

BACKGROUND OF THE INVENTION

There are commercially available various types of powered machines for cutting and simultaneously bevelling large diameter pipes in situ. Some machines have rotary cutting tools which are advanced about the periphery of the pipe to effect the desired working action. Others use inclined torches similarly advanced both to cut and bevel metal pipes. Some rotary tool machines are powered by electricity, others are powered either by compressed air or by hydraulic fluids.

For instance, U.S. Pat. No. 1,932,462 discloses a pipe cutter which uses an electric motor to rotate a cutting tool as the cutter is displaced about the periphery of a pipe to be cut. U.S. Pat. No. 2,842,238 discloses a similarly movable tool for both cutting and bevelling pipe, the tool being powered by electricity, hydraulic fluid or compressed air. U.S. Pat. No. 2,291,395 discloses a pipe cutting machine which utilizes compressed air both to rotate the cutting tool and to drive the tool about the periphery of a pipe to be cut. U.S. Pat. No. 3,088,352 discloses a tool for use both in cutting and bevelling pipe. Various other types of machines for cutting pipe are disclosed in U.S. Pat. Nos. 3,168,002; 3,431,646; and 3,916,519.

While various commercially available and patented machines may function satisfactorily for their intended purposes, they all have certain limitations rendering them less than entirely satisfactory for cutting large diameter pipes in situ. For example, when cutting large diameter pipes it is important for the cut to be square, i.e. to be in a plane orthogonal to the longitudinal axis of the pipe. This means that when a groove, or cut, is started at one location on the periphery of the pipe it should meet precisely the other end as the rotary tool advances about the entire periphery of the pipe. Thus, anomalies in cutting accuracy can be amplified with laree diameter pipes unless the cutting machine is carefully constructed and skillfully operated.

The cutting of large diameter pipes in situ creates other problems. For instance, it is often necessary for such pipes to be cut while laying in a narrow trench which may contain water. A commercially satisfactory pipe cutting and bevelling machine must be sufficiently compact so as to be capable of being rotated about the entire periphery of the pipe often with minimal clearance between the pipe and the trench. In addition, a commercially desirable pipe cutting and bevelling machine should be capable of being readily adjusted to cut and bevel pipes of various diameters and thicknesses, should be sufficiently light in weight as to be transported readily to its point of usage, and should be capable of being connected and operated easily.

OBJECTS OF THE INVENTION

With the foregoing in mind, a primary object of the present invention is to provide an improved powered machine particularly suited for accurately cutting relatively large diameter pipes in situ.

Another object of the present invention is to provide a unique powered pipe cutting and bevelling machine which is capable of cutting and bevelling pipes in spatially confined areas, such as in a trench, and of doing so efficiently and accurately.

A further object of the present invention is to provide a lightweight, compact, portable powered pipe cutting and bevelling machine which is capable of being used efficiently to cut and bevel pipes in situ.

SUMMARY OF THE INVENTION

More specifically, the present invention provides a relatively lightweight and compact, portable powered machine particularly suited for use in cutting and bevelling relatively large diameter pipes of various compositions. The machine includes a movable carriage adapted to be advanced manually about the periphery of a pipe and guided in a precise path by an adjustable link assembly which circumscribes the pipe and is connected at opposite ends to the carriage. The carriage has an upstanding inverted U-shaped protrusion forming a downwardly open, pipe confronting recess in which is mounted a rotary means mounting a rotary tool. A yoke mounts the rotary means and hence the rotary tool in the carriage recess for adjustable movement radially of the pipe. The tool is located on one side of the carriage and a source of fluid under pressure is connected to the rotary means on the other side of the carriage. The desired cutting and bevelling operation on the pipe is performed by manually advancing the carriage and link assembly about the periphery of the pipe as the rotary means rotates the tool.

BRIEF DESCRIPTION OF THE DRAWINGS

The foregoing and other objects, features and advantages of the present invention should become apparent from the following description when taken in conjunction with the accompanying drawings, in which:

FIG. 2 is an enlarged fragmentary side elevational view of the machine illustrated in FIG. 1 with portions broken away and sectioned to expose inner construction details; and FIG. 3 is an end elevational view of the machine with portions broken away and sectioned to expose construction details, the upper portion being foreshortened lengthwise to show the cutting and bevelling tool in an upwardly adjusted position.

DESCRIPTION OF THE PREFERRED EMBODIMENT

Figure 1:
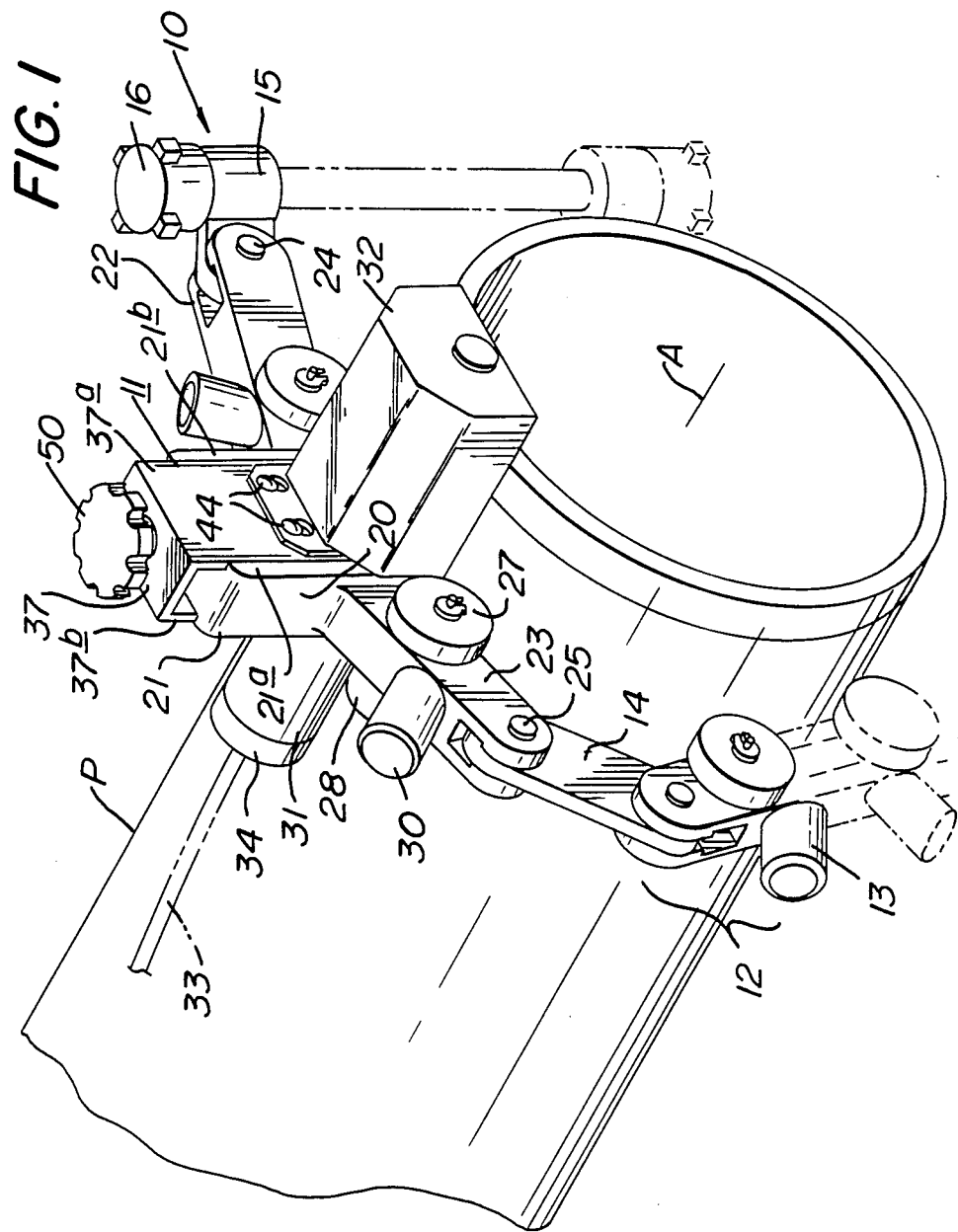
FIG. 1 is a perspective view of a pipe cutting and bevelling machine which embodies the present invention and which is shown in operative engagement with a pipe in the process of cutting the same.

Referring now to the drawings, FIG. 1 illustrates a portable powered pipe cutting and bevelling machine 10 which embodies the present invention. The pipe cutting machine 10 is shown installed on a relatively large diameter pipe P having a longitudinal axis A. The machine 10 may be used to cut and bevel pipes of any of a variety of compositions, including iron, plastic, clay, and the like, and is specifically designed to be used in situ to cut and bevel large diameter pipes.

The machine 10 comprises a power unit 11 which is movable manually about the periphery of the pipe P in use. The power unit 11 is guided in an accurate path about the periphery of the pipe P by an adjustable link assembly 12 which circumscribes the pipe P and is connected at opposite ends to the power unit 11. The link assembly 12 includes a plurality of wheeled trucks 13 pivotally connected endwise by links 14. A slack take-up mechanism 15 is connected to the carriage 11 and one of the trucks (not shown) for permitting the length of the link assembly 12 to be adjusted by means of rotary adjusting knobs, such as the knob 16.

The above-described link assembly 12 is conventional and has been used commercially by the assignee of the present application in combination with a manual plastic pipe cutter. Accordingly, as far as the present invention is concerned, the link assembly 12 may be provided by any of a variety of known flexible lengthwise adjustable linkage assemblies capable of being connected at opposite ends to the power unit 11 and rotated therewith about the periphery of the pipe P. For instance, link-type chains and rollers may be substituted for the link assembly 12. Accordingly, the present invention should not be regarded as being limited to the particular form of link assembly 12 illustrated and described herein.

The pipe cutting and bevelling machine 10 is compact, portable and particularly suited for cutting pipes in situ under spatially confined conditions. To this end, the power unit 11 includes a carriage 20 having an upstanding inverted U-shaped protrusion 21 and a pair of integral arms 22 and 23 extending outwardly therefrom fore and aft (in the direction of movement of the carriage 20) tangentially of the pipe P. The arms 22 and 23 are pivotally connected at their ends to the link components 15 and 14 as by quick release pins 24 and 25, respectively. A pair of wheels are mounted on each arm to permit the power unit 11 to be advanced about the periphery of the pipe P. The wheels, such as the wheels 27 and 28 mounted on the arm 23, are relatively large in diameter and are located at about the midpoint of the arm 23. The wheels space the arms 22 and 23 outward from the periphery of the pipe P and dispose the carriage protrusion 21 radially of the pipe P when the power unit 11 is connected in the manner illustrated in FIG. 1. A handle lug, adapted to receive a tubular handle (not shown) is preferably provided on each arm, such as the handle lug 30 provided on the arm 23, to enable the power unit 11 to be advanced manually about the pipe P as by pulling or pushing on the installed handle. If a link assembly composed of chain-like links is employed in lieu of the link assembly 12 illustrated, at least one truck having a radially projecting handle should be provided diametrically opposite the power unit 11 to facilitate rotation of the machine 10 about the pipe P.

The power unit 11 includes a rotary means 31 mounted in the carriage 20 for rotating a cutting and bevelling tool assembly contained within a tool guard assembly 32 also mounted to the carriage 20. In the illustrated embodiment, the rotary means 31 is an air-type fluid motor having a relatively small diameter housing, or body (less than about two inches) which is disposed transverse to the path of movement of the carriage, i.e. lengthwise of the pipe P. The air motor 31 has an axial end coupling 34 which is connected to a power source by a flexible line 33 (shown in phantom lines in FIG. 1). While an air motor 31 is preferred because of its compactness, other types of motors and power sources may be used to drive the rotary cutting and bevelling tool contained within the tool guard assembly 32.

The cutting and bevelling tool and the manner in which it is connected to the motor 31 may best be seen in FIG. 3. As shown therein, the motor 31 is clamped at axially spaced locations in a pair of collars 35 and 36 which are fastened to the lower portions of a yoke 37 having flanges 37a, 37b mounted for relative vertical sliding movement on the carriage protrusion 21. The motor 31 has a shaft 31a with a distal end portion on which is releasably mounted a circular blade 38 and frusto-conical bevel cutter 39. Preferably the distal end of the shaft 31a is threaded, and the blade 38 and bevel cutter 39 clamped between an arbor 40 and a spring washer 41 by a nut 42 threadedly engaged with the shaft end 31a. The small diameter of the motor body enables the rotational axis of the motor shaft 31 to be disposed as close as about one inch to the periphery of the pipe P, e.g. in the illustrated embodiment about one-half the diameter of the motor housing.

The composition of the cutter blade 38 will depend, of course, on the composition of the pipe to be cut, carbide or diamond tipped and high speed blades being preferred. Also, the bevel cutter 39 may be omitted and replaced with a spacer (not shown) should only pipe cutting be desired. If desired other types of pipe working tools may be mounted on the motor shaft to perform various pipe working operations.

The upper portions of the cutting blade 38 and bevel cutter 39 are enclosed by the tool guard assembly 32 which extends laterally from the carriage protrusion 21 and is fastened to the yoke flange 37a, as by machine screws 44. A retractable shield 46 is pivotally mounted to the distal end of the tool guard assembly 32 by a pivot connection 47 which permits the retractable shield 46 to pivot thereabout either into a blade exposing position for working on the pipe, such as illustrated in FIG. 3, or into a blade enclosing position encircling the lower portion of the blade 38 and bevel cutter 39 when the machine is not in use. The retractable shield 46 may be biased into its blade enclosing position either by a suitably connected spring (not shown) or by gravity.

The motor 31, tool assembly 38, 39, and tool guard assembly 32 are mounted for adjustable movement radially of the pipe P. To this end, as best seen in FIG. 2, the inverted U-shaped configuration of the carriage protrusion 21 provides a downwardly open, transversely extending recess 21a which is dimensioned to receive the motor body 31 and to permit it to be raised and lowered therein radially of the pipe P. The motor mounting yoke 37 is guided vertically relative to the carriage protrusion 21 by guide means including a pair of integral flanges 21a, 21b extending in spaced parallel relation on opposite sides of the carriage protrusion 21 and engaging opposite lengthwise extending edges of each yoke flange 37a, 37b. See FIG. 1. In the illustrated embodiment, the carriage 20 and its protrusion recess 21a are of lightweight metal, such as aluminum, and/or aluminum alloy, and the flanges 21a, 21b are machined in opposite sides thereof parallel to the recess 21a. Preferably, a means (not shown) may also be provided to retain the toolside yoke flange 37a firmly slidably engaged with the side of the carriage protrusion 21. Thus, the motor 31 may be placed in any selected position between the fully upwardly adjusted position illustrated in FIG. 3 and the fully downwardly adjusted position illustrated in FIG. 2. When in the downwardmost position, the rotational axis of the motor shaft 31a is located very close to the periphery of the pipe P being even closer than the rotational axes of the carriage wheels. As a result, even relatively thick walled pipe can be cut with a blade of relatively small diameter since the motor 31 can be positioned in close proximity with the outer periphery of the pipe P.

To enable the cutting blade 38 and its drive motor 31 to be adjusted quickly and accurately radially of the pipe, and to permit the initial or plunge cut to be made easily, an adjusting mechanism is provided on the carriage 20. As best seen in FIG. 2, the adjusting mechanism includes an adjusting wheel 50 overlying the top of the carriage protrusion 21 and journaled for rotation about a vertical axis in a horizontal flange 37c of the motor mounting yoke 37. The adjusting wheel 50 is connected to a jackscrew 51 which is threadedly received in a nut 52 threaded into a bore provided in the upper end of the carriage protrusion 21. The jackscrew 51 extends lengthwise of the carriage recess 21a. With this structure, rotation of the adjusting wheel 50, such as in the clockwise direction in FIG. 1, displaces the yoke 37 downwardly relative to the carriage protrusion 21 and thereby displaces the motor 31 downwardly in its recess 21a toward the pipe P. This permits downward pressure to be applied to the cutting blade 38 for plunging it into the pipe P, as will be described. Conversely, rotation of the wheel 50 in the opposite direction draws the motor 31, and hence the tool assembly 38, 39 upwardly in the protrusion recess 21a away from the pipe P, such as into the upper position illustrated in FIG. 3.

The motor 31 and tool assembly 38, 39 can be locked in any selected adjusted position. To this end, a releasable locking means is associated with the yoke 37 and carriage protrusion 21 for clamping the yoke 37 to the carriage protrusion 21. As best seen in FIG. 3, the releasable locking mechansim includes a locking knob 55 having a threaded shaft 56 threadedly received in a bore in the side of the carriage protrusion 21. The locking knob shaft 56 passes through a vertically elongated slot 37' in the yoke flange 37b. When the adjusting knob 55 is rotated clockwise, it applies clamping pressure between the yoke flange 37b and the carriage protrusion 21 for locking the yoke 37 in a selected adjusted position as determined by the aforedescribed operation of the adjusting wheel 50.

In use in cutting a pipe, such as the pipe P, the power unit 11 and link assembly 12 are assembled in the manner illustrated in FIG. 1 and are initially arranged with the cutting blade 38 and bevel tool 39 spaced upwardly from the outer periphery of the pipe P such as in the manner illustrated in FIG. 3. The axial coupling 34 of the motor 31 is then connected to a source of air under pressure via the hose 33 which, it is noted extends in a generally axial direction of the pipe P on the side of the carriage opposite the cutting blade 38. With air pressure being supplied to the motor 31, and the blade 38 rotating, the adjusting wheel 50 is rotated to feed the rotating blade 38 radially into the pipe P to whatever depth is desired. For example, the cutting blade 38 may be adjusted to sever the pipe in a single pass, in which event it is displaced through a distance greater than the thickness of the pipe wall. When the desired depth of cut has been set, the locking knob 55 is rotated to hold the adjusted depth.

The power unit 11 can then be rotated about the periphery of the pipe P, as by either pushing or pulling on the handle lug 30, on a handle connected to the handle lug 30, or on the carriage 20. The pipe edge can be bevelled after the pipe has been cut by loosening the locking knob 55 and rotating the adjusting wheel 50 to engage the bevel cutter 39 adjacent the cut edge. After locking the same, the power unit 11 can then be rotated again about the periphery of the pipe P. Of course, cutting and bevelling can be performed simultaneously in a single pass by properly adjusting the location of the bevel tool 39 relative to the pipe periphery when making the first cut depending on various factors such as the composition of the pipe P, its wall thickness, compressed air supply, etc.

The present invention provides a number of advantages. First of all, the power unit is compact. This enables it to be rotated about the entire periphery of the pipe with minimal clearances provided around the pipe periphery. As a result, the machine of the present invention can be used to cut pipes in situ in a trench. The lengthwise disposition of the motor with respect to the pipe and the axial endwise coupling thereof to a flexible hose aids in keeping the hose out of the way of the cutting and bevelling tool and of providing minimal interference with the rotation of the power unit about the pipe. Also, when air is used as the power source for the motor, the machine can be used even in trenches having water at a sufficient depth as to cause the power unit to be submerged when passing around the underside of the pipe. In addition, the relatively small diameter of the air motor enables it to be displaced into close proximity with the outer periphery of the pipe, and this enables pipes having relatively thick walls to be cut with cutting blades of relatively small diameter. The releasable interconnections of the linkage assembly to the power unit enables the entire machine to be transported in a compact container and assembled quickly and easily in the field.

In view of the foregoing, it should be apparent that the present invention now provides an improved portable, powered pipe cutting and bevelling machine.

While a preferred embodiment of the present invention has been described in detail, various modifications, alterations and changes may be made without departing from the spirit and scope of the present invention as defined in the appended claims.

I claim:

1. In a portable powered pipe cutter including movable cutting means adapted to engage and be moved about the outer periphery of a pipe to be cut, and adjustable link means connected to said movable cutting means and encircling said pipe, said adjustable link means being movable with said movable cutting means about the periphery of the pipe for permitting said movable means to be advanced manually in a guided path orthogonal to the longitudinal axis of the pipe, the improvement wherein said movable cutting means comprises:

a carriage having an upstanding protrusion with an inverted U-shaped configuration providing a downwardly open recess adapted to confront the outer periphery of the pipe and to extend outward therefrom, said carriage having a pair of arms extending in opposite directions from said protrusion, said arms being aligned with said adjustable link means and lying in the path of movement thereof about the pipe, each arm having an end connected to said adjustable link means and having means beween said end and said protrusion rotatably engaging the pipe surface, rotary means disposed in said recess and extending transverse to the path of movement of the carriage and hence lengthwise of the pipe, a yoke movably mounted on said carriage protrusion for mounting said rotary means for movement inwardly and outwardly of said pipe in said transverse relation relative to said recess and the confronting peripheral pipe surface, said yoke including a base extending across said protrusion and a pair of flanges depending therefrom on opposite sides of said protrusion in sliding engagement therewith for guiding said yoke relative to said protrusion, adjustable means on said carriage and yoke for displacing said yoke relative to said carriage, tool means adapted to be connected to said rotary means to one side of said carriage for operating on the pipe, and coupling means adapted to connect said rotary means to a source of power, whereby operations can be conducted on the pipe by rotating the carriage thereabout.

2. A pipe cutter according to claim 1 wherein said tool means includes means for both cutting and bevelling the pipe.

3. A pipe cutter according to claim 2 wherein said cutting means includes a blade having a circular edge and said bevelling means includes a separate bevel cutter mounted adjacent to said blade.

4. A pipe cutter according to claim 1 wherein said rotary means includes a motor having a shaft extending from one side of said yoke for mounting said tool means thereat, and a flexible means extending from the opposite side of said yoke for connecting said motor to said power source.

5. A pipe cutter according to claim 4 wherein said motor is fluid powered and said coupling includes a flexible hose extending laterally of the carriage and disposed generally along the pipe.

6. A pipe cutter according to claim 1 including locking means on said carriage protrusion for releasably clamping said yoke in selected adjusted positions.

7. A pipe cutter according to claim 1 including a tool guard means extending laterally of said carriage for enclosing the upper portion of said tool means, said tool guard means having a proximal end connected to said yoke and movable therewith relative to said carriage and having a distal end remote from said carriage, said tool guard means including a retractable tool shield adapted to enclose the lower portion of said tool means, said retractable shield being pivotally mounted to the distal end of said tool guard means, and means carried on said tool guard means for biasing said retractable tool shield into a position normally enclosing said tool means.

8. A pipe cutter according to claim 1 including a lug projecting upwardly from at least one arm for receiving a handle to facilitate rotation of the carriage about the pipe.

9. In a portable powered pipe cutter including movable cutting means adapted to engage and be moved about the outer periphery of a pipe to be cut, and adjustable link means connected to said movable cutting means and encircling said pipe, said adjustable link means being movable with said movable cutting means about the periphery of the pipe for permitting said movable means to be advanced manually in a guided path orthogonal to the longitudinal axis of the pipe, the improvement wherein said movable cutting means comprises:

a carriage having an upstanding protrusion with an inverted U-shaped configuration defining a downwardly open recess adapted to confront the outer periphery of the pipe and to extend outward therefrom, said carriage having a pair of arms extending in opposite directions away from said protrusion in the path of movement of the carriage about the pipe, each arm being aligned with said adjustable link means in the path of movement thereof about the pipe and each arm terminating in an end remote from said protrusion, means mounted on each arm between said protrusion and said arm ends for rotatably engaging the outer periphery of the pipe and thereby movably supporting said carriage for motion about said pipe, a motor disposed in said recess and extending transverse to the path of movement of the carriage and hence lengthwise of the pipe, a yoke movably mounted on said carriage protrusion for mounting said motor for movement in said transverse relation relative to said recess and the confronting peripheral pipe surface, said yoke having a base overlying said protrusion and a pair of flanges depending therefrom and extending along opposite sides of said recess for mounting said yoke for said inward and outward movement with respect to said pipe, guide means on opposite sides of said carriage protrusion for slidably receiving said yoke flanges and guiding said yoke for said movement relative to said protrusion, adjustable means on said carriage and yoke for displacing said yoke relative to said carriage, said adjustable means including a jack screw connecting said yoke base and said carriage protrusion, and rotatable means overlying said yoke base for turning said jack screw to displace said yoke relative to said carriage, means securing said motor to said yoke flanges adjacent the lower ends thereof, tool means adapted to be connected to said motor to one side of said carriage for operating on the pipe, and coupling means on the opposite side of said carriage adapted to connect said motor to a source of power, said coupling means being flexible and extending substantially axially of said motor and longitudinally of said pipe adjacent to said carriage, whereby operations can be conducted on the pipe by rotating the carriage thereabout.

10. In a portable powered pipe cutter including movable cutting means adapted to engage and be moved about the outer periphery of a pipe to be cut, and adjustable link means connected to said movable means and encircling said pipe for permitting said movable means to be advanced in a guided path orthogonal to the longitudinal axis of the pipe, the improvement comprising:

a carriage having an upstanding protrusion with an inverted U-shaped configuration defining a downwardly open recess adapted to confront the outer periphery of the pipe and to extend radially thereof, said carriage being of lightweight material and having a pair of arms integral with said protrusion and extending in opposite directions away from said protrusion in the direction of movement of the carriage about the pipe, a pair of wheels mounted on each arm and spaced outward of said recess for rotatably engaging the outer periphery of the pipe, a fluid motor disposed in said recess and extending transverse to the path of movement of the carriage and hence lengthwise of the pipe, said fluid motor having a rotary shaft and a body coaxial therewith, a yoke movably mounted on said carriage protrusion for mounting said fluid motor for movement in said transverse relation relative to said recess and the confronting pipe surface, said yoke having a pair of flanges depending along opposite sides of said protrusion in sliding engagement therewith and mounting said fluid motor adjacent the lower ends thereof, adjustable means on said carriage and yoke for displacing said yoke relative to said carriage, said adjustable means permitting said motor shaft to be positioned substantially as close to the pipe surface as about one-half the diameter of the motor housing, tool means adapted to be connected to said motor to one side of said carriage for operating on the pipe, said tool means includes rotary means on said motor shaft for both cutting and bevelling the pipe, and coupling means on the opposite side of said carriage adapted to connect said motor to a source of fluid under pressure, means carried on said yoke providing a guard having a retractable portion for normally enclosing said tool means, and locking means on said carriage for releasably securing said yoke in selected adjusted positions, whereby the pipe can be cut and bevelled by rotating the carriage thereabout.

11. In a portable powered pipe cutter including movable cutting means adapted to engage and be moved about the outer periphery of a pipe to be cut, and adjustable link means connected to said movable means and encircling said pipe, said adjustable link means being movable with said movable cutting means about the periphery of the pipe for permitting said movable means to be advanced manually in a guided path orthogonal to the longitudinal axis of the pipe, the improvement wherein said movable cutting means comprises:

a one-piece carriage having an upstanding protrusion with an inverted U-shaped configuration defining a downwardly open recess adapted to confront the outer periphery of the pipe and to extend radially outward thereof, said carriage having a pair of arms integral with said protrusion and extending in opposite directions away from said protrusion in the path of movement thereof about the pipe, each arm being aligned with said adjustable link means in said path of movement and each arm terminating in an end remote from said protrusion, a pair of wheels mounted on opposite sides of each arm between said protrusion and the end of each arm for rotatably engaging the outer periphery of the pipe and movably mounting the carriage thereon, means for releasably connecting said arms adjacent their ends to said adjustable link means, a motor disposed in said recess and extending transverse to the path of movement of the carriage and hence lengthwise of the pipe, said motor having a rotary shaft and a body coaxial therewith, a yoke movably mounted on said carriage protrusion for mounting said motor for movement radially of said pipe in said transverse relation relative to said recess and the confronting pipe surface, said yoke having a pair of flanges depending along opposite sides of said protrusion in sliding engagement therewith and mounting said motor adjacent the lower ends thereof, adjustable means on said carriage and yoke for displacing said yoke relative to said carriage, said adjustable means permitting said motor shaft to be adjusted into a position in close proximity to the pipe surface, tool means adapted to be connected to said motor shaft to one side of said carriage for operating on the pipe, coupling means on the opposite side of said carriage adapted to connect said motor to a power source, and locking means on said carriage for releasably securing said yoke in selected adjusted positions, whereby the carriage can be rotated about the pipe the tool is operating thereon.

* * * * *